T. W. Harvey,
Making Wrought Iron Direct from Ore,
Nº 11,584. Patented Aug. 22, 1854.
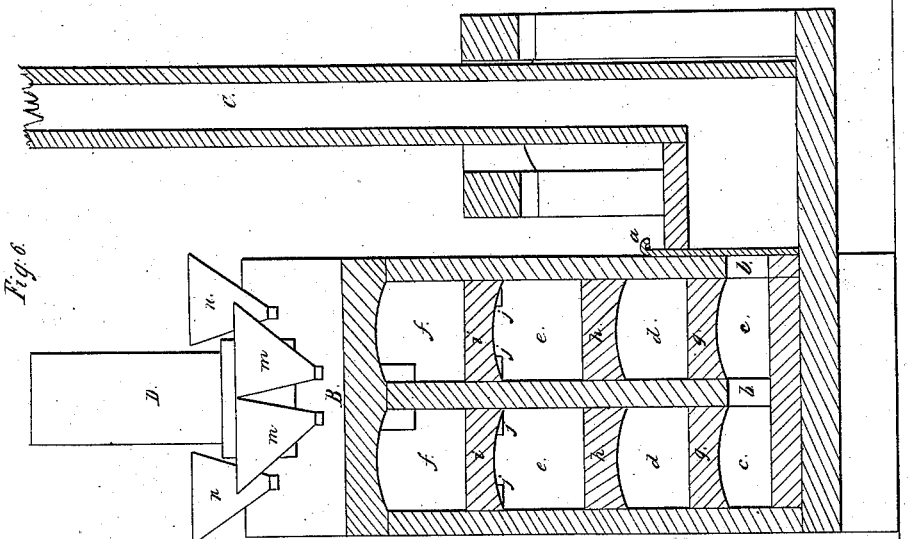
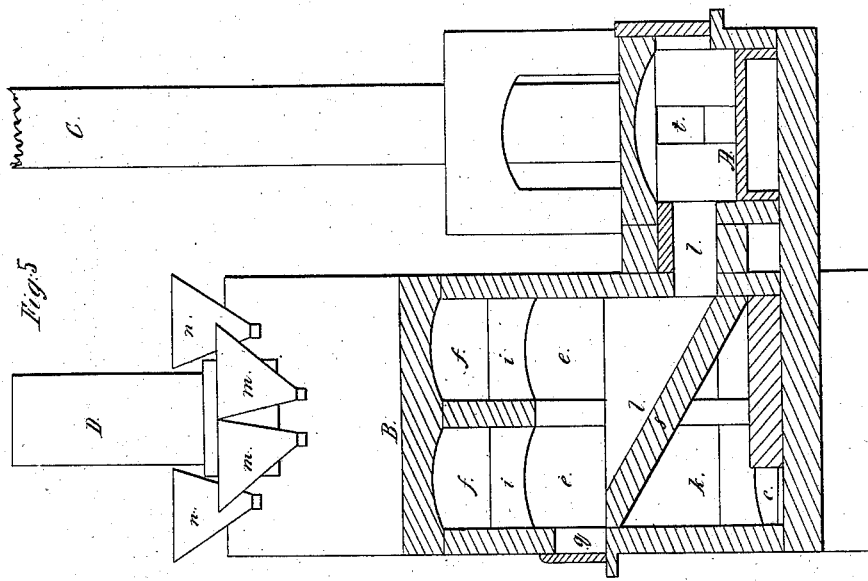

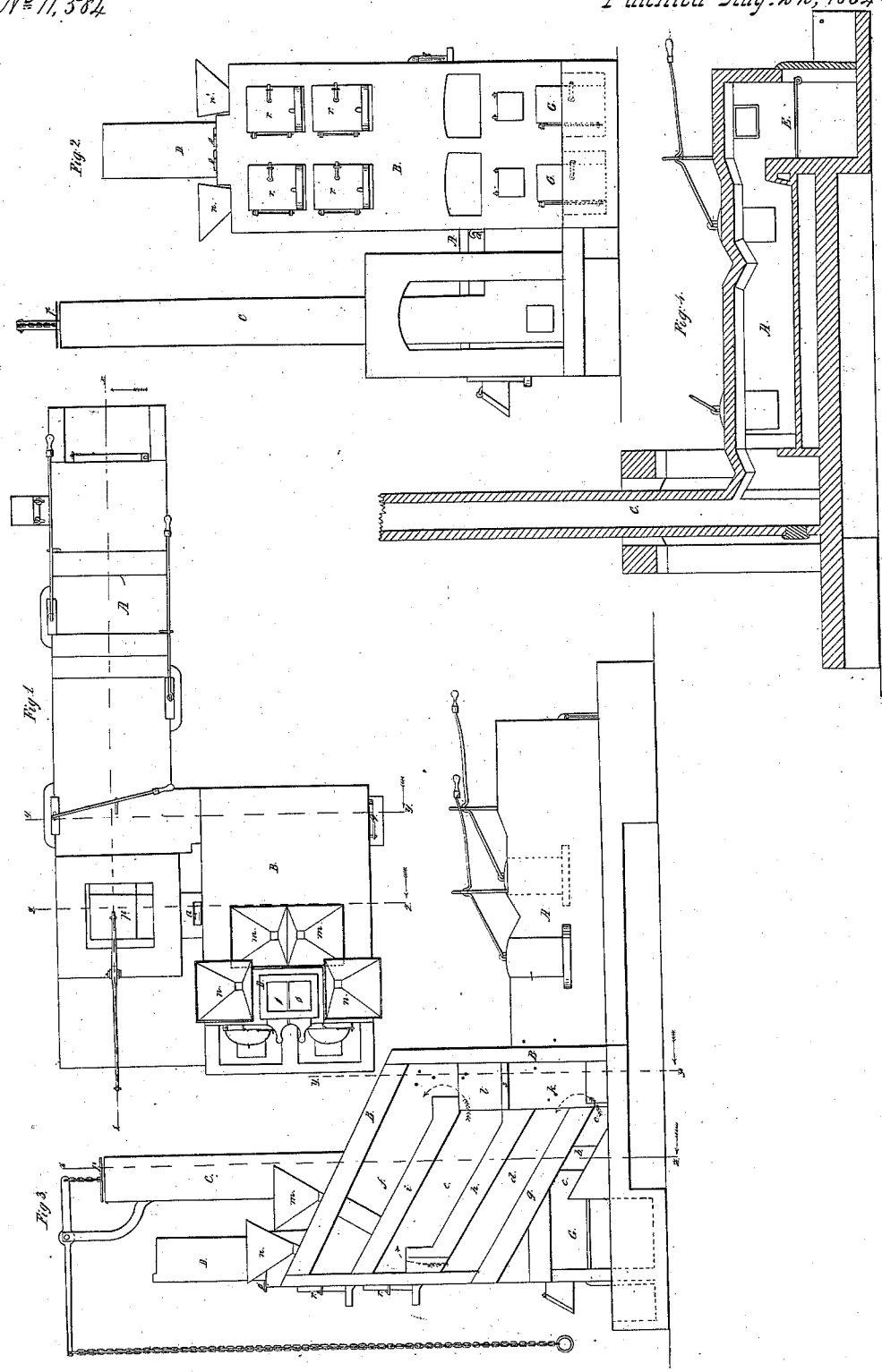
T. W. Harvey,
Making Wrought Iron Direct from Ore,
No 11,584. Patented Aug. 22, 1854.

UNITED STATES PATENT OFFICE.

THOMAS W. HARVEY, OF NEW YORK, N. Y.; EDWD. P. COWLES AND H. A. HARVEY, ADMINISTRATORS OF SAID THOS. W. HARVEY, ASSIGNORS TO THE HARVEY STEEL AND IRON COMPANY.

IMPROVEMENT IN FURNACES FOR MAKING WROUGHT-IRON DIRECTLY FROM THE ORE.

Specification forming part of Letters Patent No. 11,584, dated August 22, 1854.

*To all whom it may concern:*

Be it known that I, THOMAS W. HARVEY, of the city, county, and State of New York, have invented a new and Improved Method of Making Wrought-Iron Directly from the Ore, which is also applicable to reducing ores of other metals; and I do hereby declare that the following is a full and exact description thereof, reference being had to the accompanying drawings, making part of this specification, in which—

Figure 1 is a plan of a combined furnace for applying my improved method of reducing ores; Fig. 2, a front elevation thereof; Fig. 3, a side elevation, the side wall of the furnace being removed to show the inside arrangement; Fig. 4, a vertical section of the same in the line $x\,x$ of Fig. 1; Fig. 5, a vertical section in the line $y\,y$ of Figs. 1 and 3, and Fig. 6 a vertical section in the line $z\,z$ of Figs. 1 and 3.

Like letters designate corresponding parts in all the figures.

The nature of my invention consists, first, in causing the deoxidating and desulphurating flames and gases of the furnace to act directly in contact with properly-prepared ores of iron (and other metals) placed upon suitably-arranged tables, while at the same time a high degree of heat is imparted to the under side of said tables.

I employ a reverberatory furnace, A, of the ordinary construction, (except that it is considerably longer than the common puddling-furnace, and has an additional reverberatory projection from the top, about midway,) for balling and welding the deoxidated and desulphurated metal, E being the grate where the fuel is applied for heating it. This furnace is combined directly with the furnace B, containing the reducing-tables (hereinafter described) and an auxiliary grate or furnace, G, which is employed to furnish additional heat to the ore if the surplus heat from the furnace A should not be sufficient for that purpose, or whenever it may be convenient to employ it. Within said furnace I arrange a series of any suitable number of tables, $h\,h$ and $i\,i$, in an inclined position, as shown in the drawings. They may be horizontal; but a certain degree of inclination is most suitable for managing the ore thereon and finally discharging it therefrom. I introduce the ore properly prepared and mixed with the proper proportions of any good carbonaceous material and flux, by means of hoppers $m\,m$ and $n\,n$ at the top of the furnace, the former conducting to the lower tables, $h\,h$, and the latter to the upper tables, $i\,i$. The heat and gases from the furnace A are conducted into the space $k$ below the tables through the flue $b$, Figs. 3 and 6, and flues $c\,c$, which latter also conduct the flames and gases from the auxiliary furnace G to the same destination. From the space $k$ then the heat and gases from both furnaces are conducted through the spaces $d\,d$ between the plate $g$ (which covers the furnace G and flues $c\,c$ and $b$) and the lower table, $h\,h$, thence up by the flues $j\,j$, through said tables into the spaces $e\,e$ between the tables $h\,h$ and $i\,i$, then around the open ends of the latter tables, through the spaces $f\,f$ above them, and so on, around any number of tables, and finally out by the chimney D. The whole course is indicated in Fig. 3 by arrows. A damper, $a$, regulates the supply of heat and gases from the furnace A to the furnace B, or entirely excludes them, and all superabundance of them is conducted off by the stack C, which should have a damper, $p$, at the top, to regulate its draft. The chimney D is also furnished with dampers $o\,o$, for regulating its draft. The flames and highly-heated carbureted gases generated in the furnaces pass along in direct contact with the prepared ore spread on the tables, and thus act most efficiently to deoxidate the oxides of the metal and desulphurate the sulphurets, &c. At the same time a high degree of heat is imparted to the under sides of the tables as the flames pass beneath them, and thereby greatly assist in heating the strata of ores thereon. By this means I secure all the advantages to be derived by acting upon the ores in their strata through inclosing or supporting walls or tables, and also of the direct chemical action of the highly-heated carbureted gases from the furnaces upon the ores, without the injurious effect of a too great supply of air in consuming said gases and reoxidating the metal. When the contents of the tables have been reduced to the proper condition, they are conducted directly to the welding-furnace A down the transverse-inclined plane of the reservoir S, which is arranged so as to receive the contents of all the tables, as represented in the drawings, there being a sufficient space, $l$, to allow the metal to pass readily down. It is then received on the long welding-hearth, where the entire process of making wrought-iron is completed without interruption. There are working-doors $r$ $r$, &c., to the several deoxidating-tables, and an extra working-door, $q$, at the side of the furnace, through which to control the transfer of the reduced metal from the reservoir or the tables to the welding-furnace. The passage Z may also serve to convey a portion of the heat and gases from said furnace direct to the tables.

The principles of the above method of treating iron ores are also applicable to the reduction of many of the ores of other metals—such as galena, the ores of copper, &c.—and I contemplate the application of the method in the smelting of such ores.

In order to obtain the fullest effect of the above process, the ore and the proper proportion (about twenty per cent., more or less) of carbonaceous matter are mixed together, reduced to a fine powder, and spread over the tables at only such a depth that all the particles shall be well exposed to the action of the deoxidating flames and gases. The furnace being heated sufficiently hot, the dampers and blast are so regulated as to cause the flame or gases to be forced out from every opening in the furnace, to exclude the entrance of all air that has not passed through the grate, and thus been deprived of its oxygen, thereby securing the ore treated from reoxidation. The ore is now kept at a bright red heat from two to twenty hours, until thoroughly deprived of its oxygen, when it is caused to descend into the reservoir or transverse inclined plane S, and thence onto the welding-hearth A, where the same exclusion of air, save that which passes through the grating, is continued. This hearth is prolonged, to insure with some ores more certainty of deoxidation. The ore, being now subjected to a greater degree of heat, is brought forward by the operators to the middle or "flourishing" door, where the process of "naturing," or separation of the iron from the earthy and foreign substances, and decarbonization of the metal takes place, (and on completion is carried forward to the baller,) when the operation of balling up is carried on by the workman through the balling-door at the hottest part of the furnace. The ball in its agglomeration is stirred, kneaded, and worked over and over in the melted cinder at this point. This bath of melted metal is necessary, to preserve the loop or ball from the action of the oxygen, necessarily present when there is the requisite heat to melt the earthy matter and to cook the ball perfectly, which process is complete when the ball has become sufficiently heated, so that by compression under the hammer or otherwise, to allow the slag to be thoroughly expressed and the metal to weld through all its parts, leaving it pure wrought or malleable iron, in such merchantable shape as may be desired.

Having thus fully described my improved method of making wrought-iron direct from the ore and the means of applying it, what I claim therein as new, and desire to secure by Letters Patent, is—

Causing the deoxidating and desulphurating flames and gases generated in the furnace to act directly in contact with properly-prepared ores of iron (and other metals) placed upon suitably-arranged tables, while at the same time a high degree of heat is imparted to the under sides of said tables.

THOS. W. HARVEY.

Witnesses:
J. L. HALSEY,
J. V. HALSEY.